United States Patent [19]

Tanguay

[11] Patent Number: 5,608,272

[45] Date of Patent: Mar. 4, 1997

[54] VEHICLE ANTI-THEFT DEVICE

[75] Inventor: M. Sylvain Tanguay, Terrebonne, Canada

[73] Assignee: OtoProtec, Inc., Quebec, Canada

[21] Appl. No.: 271,832

[22] Filed: Jul. 7, 1994

[51] Int. Cl.⁶ .................................................. B60R 25/10
[52] U.S. Cl. ........................ 307/10.2; 307/10.4; 307/10.5; 180/287; 340/426
[58] Field of Search ..................................... 307/9.1–10.8; 123/198 DB, 198 DC; 340/425.5, 426–428, 430, 825.69, 825.72; 180/287; 361/171

[56] References Cited

U.S. PATENT DOCUMENTS

| | | | |
|---|---|---|---|
| 4,403,675 | 9/1983 | Cardwell | 307/10.2 |
| 4,736,419 | 4/1988 | Roe | 380/3 |
| 4,908,629 | 3/1990 | Apoell | 340/825.49 |
| 4,926,665 | 5/1990 | Stapley | 70/277 |
| 4,955,453 | 9/1990 | Nishioka | 180/287 |
| 5,079,435 | 1/1992 | Tanaka | 307/10.2 |
| 5,115,145 | 5/1992 | Westberg | 307/10.3 |
| 5,172,094 | 12/1992 | Stadler | 307/10.2 |
| 5,180,924 | 1/1993 | Rudisel | 307/10.6 |
| 5,307,048 | 4/1994 | Sonders | 307/10.2 |
| 5,351,781 | 10/1994 | Pritchard et al. | 180/287 |
| 5,412,370 | 5/1995 | Berman | 307/10.2 |

Primary Examiner—William M. Shoop, Jr.
Assistant Examiner—Peter Ganjoo

[57] ABSTRACT

An anti-theft alarm system for attended and unattended vehicles enabled by a remotely carried inviolable electronic chip that is read by a voltage supplying receiver. In the unattended mode, the system operates like a conventional alarm system capable of disabling an electronically based vehicle. In an attended mode, the operator can activate the system by brake pedal depression followed by opening of the door within a predetermined time. Upon this sequence of events, the system will allow the vehicle to operate for about 60 seconds allowing the victim to get out of harms way before the vehicle becomes disabled and initiates an alarm sequence. In this mode the only method of restarting the vehicle is by use of a by-pass switch which is easily hidden and known only to the vehicle owner. The system further provides a controller chip for use in all fleet vehicles which lock or unlock the access of the vehicle and a master chip giving access to any vehicle of the fleet.

24 Claims, 3 Drawing Sheets

VEHICLE ANTI-THEFT DEVICE

FIELD OF THE INVENTION

This invention relates generally to anti-theft devices for vehicles and in particular to an anti-theft device providing theft protection while the vehicle is either unattended or attended.

BACKGROUND INFORMATION

Automobile theft is an international problem that affects every individual; either through theft of their own vehicle or as part of a class whose insurance premiums are raised to help others whose vehicles have been stolen. To this end, numerous anti-theft devices have been patented disclosing products designed to reduce unattended vehicle theft. Primarily this includes vehicles that are parked overnight.

Unattended vehicles must include those vehicles left running when parked. In many states it is illegal to leave a vehicle running unattended, that is, without a qualified driver at the controls. Unattended vehicles an attractive nuisance for children, not to mention car thieves. However, there exists many instances in which leaving an automobile running is a necessity. For instance, tractor trailers are typically left running even when the operator stops to eat or sleep. By leaving the engine running, fuel is saved since it is less expensive to idle a diesel engine than to restart it from a cold stop. A properly equipped tractor further promotes the operator to stay in the vehicle by providing sleeping quarters, wherein the running engine provides power to operate the interior heater and cooling system.

In some instances, emergency vehicles such as police cars, ambulances, or fire trucks must be left running while stopped. If such vehicles need to be driven immediately, the risk of not starting could be disastrous. Further, such vehicles may need the engine to run in order to operate auxiliary equipment such as water pumps, radios, and interior lights.

Industrial vehicles such as front end loaders are yet another type of vehicle that may be left running during working hours since restarts cause premature wear of the engine. Should these vehicles be left unattended and a curious youngster gains access, unpredictable damage to property may result.

Commercial drivers of delivery vehicles are also notorious for leaving their engines running. For instance, food delivery vehicles require constant refrigeration to prevent spoilage of food, thus the engine is left running during delivery. Private and public delivery services may make hundreds of stops per day leaving the engine running to avoid wear and tear on starting components. Due to the danger of leaving the vehicle unattended while running, the U.S. Postal service requires every vehicle that is stopped for making a delivery to shut off the engine. If the postal worker stops one hundred times a day, it is obvious that the life of the engine will be shortened accordingly.

Even private citizens may leave their vehicle running while unattended. This is especially problematic in the northern area where citizens may leave the engine running to warm up the interior during winter months.

Advanced anti-theft alarms now exist to provide protection for unattended vehicles that are left operating, however, it is noted that all know prior art systems require the ignition key to be removed upon leaving the vehicle. U.S. Pat. No. 4,403,675 discloses a motor vehicle security system which allows the engine to operate when the key is removed from the ignition. The system is set upon activation of the parking brake before the key is removed. If the key is not reinserted before releasing the parking brake, the vehicle is disabled. U.S. Pat. No. 5,115,145 discloses a motor vehicle security system which utilizes a by-pass switch allowing the engine to run when the ignition switch is turned to the "off" position and the key removed. The system disables the vehicle if moved unless the key is first replaced. This requires an affirmative action on behalf of the vehicle operator which is not suited for emergency situations.

U.S. Pat. No. 5,180,924 also discloses a motor vehicle security system which allows the engine to operate when the key is removed from the ignition. The system disables the vehicle if moved without replacement of the key. U.S. Pat. No. 4,955,453 discloses a vehicle security system which is set automatically when the operator gets out of the vehicle, a hidden switch is placed in the operator's seat.

However, none of the above systems are suited for use in attended vehicles. For instance, disabling the vehicle during a car jacking must be discrete for removal of the ignition key would be an obvious attempt at disabling the vehicle. Car jacking is a special concern due to the violent nature of the act. Car jacking is coined for those criminal elements who are incapable of defeating advanced vehicle protection devices and have taken to stealing vehicles while the driver is in the vehicle. In this situation the driver of the vehicle may be stopped at an intersection and physically forced from the vehicle. During this time a conventional alarm system is inappropriate and the criminal can easily take the vehicle without fear of the alarm. This situation is known to be very dangerous to the owner of the vehicle who realizes they are about to have their vehicle stolen and, since his alarm is disabled, can do nothing to stop it. If the owner puts up any form or resistance, bodily injury is likely to result. Should children be present, they may be taken by the thieves in their rush to leave the scene. In these instances, the need for the anti-theft device is at the greatest point yet unavailable to the operator.

Discrete tracking systems such as U.S. Pat. No. 4,908,629 issued to the Lo-Jack Corporation provide an excellent method of vehicle recovery but does not provide instant theft protection. The system is dependent upon properly equipped police vehicles to track the stolen vehicle making the system inappropriate for emergency situations. Thus, the owner of the vehicle must contact the police regarding the stolen vehicle. Should the owner not be able to find a telephone, or had the thieves also taken the owners identification code, the delay can give the thieves time to leave the area and begin dismantling of the vehicle.

Finally, the prior art does not teach an effective method for enabling or disabling of anti-theft devices. The use of keys is simple to duplicate. Encrypting of key devices have improved the art but are expensive to manufacture and have limited codes available. U.S. Pat. No. 5,079,435 discloses an electronic encrypted key that cannot be duplicated, however, the disclosure does not teach use of the encrypted key for disabling once the key is inserted. U.S. Pat. No. 4,955,453 provides enciphered code that is formed by placement of vehicle components. The disclosure does not teach encoding of the alarm system while the vehicle is attended.

Thus, what is needed in the art is an anti-theft device that works with both attended and unattended vehicles further providing a discrete initiation should the operator of the vehicle be attacked necessitating the use of the theft device.

SUMMARY OF THE INVENTION

The present invention satisfies this need through provision of an anti-theft device that operates in both an unattended and attended mode. In general the instant invention works like a conventional alarm system that disables the starting mechanism of a vehicle. Unique to this invention is the ability to program the anti-theft device to disable the vehicle upon the occurrence of certain predetermined factors. Thus, even when the operator is in the vehicle, should the vehicle be taken by an unauthorized person the vehicle will be disabled.

The preferred embodiment of the instant invention is to provide vehicle disabling by shutting off the ignition or fuel supply should the situation warrant that the function be triggered. Enabling of the system is performed by contacting a remote EPROM chip with a vehicle based receiving unit. The receiving unit delivers voltage to the chip or pass-key thereby providing power to energize the chip for reading of an encrypted code stored in the chip. A code stored in the chip is unique and inviolable preventing interpretation or breaking of an encrypted code as the chip can provide nearly three thousand billion combinations. In the center of the receiving base is a light emitted diode providing ease of location in the dark and indication of system functions. When enabled the system provides time to enter or exit the vehicle for disarming and initiating an alarm sequence.

When the engine is left in an unattended mode, the instant invention can be enabled allowing the engine to continue to run. If the pass-key is not used to disable the system before depressing the brake, the vehicle will automatically become disabled and initiate an alarm sequence.

Should the engine be in an attended mode and the operator be forced to exit, as in a car jacking situation, the operator can activate the system by brake pedal depression followed by opening of the door within a short period of time, i.e. five seconds. Upon this sequence of events, the system will allow the vehicle to operate for about sixty seconds which allows the operator, now victim, to get out of harms way before the vehicle is disabled and the thieves forced to run. In this mode the only method of restarting the vehicle is by use of a by-pass switch which is hidden in the vehicle and its location known only to the vehicle owner.

The instant invention has found particular usefulness in fleet operations. In this type of environment, each vehicle can be equipped with a master encrypted pass key having an embedded code separate and distinct from the aforementioned chip codes. Thus, the business owner may allow each of their drivers a chip for operation of the vehicle in the above mentioned alarm modes yet retain a master chip allowing the owner to alarm each vehicle every night locking the system so as to deny access even to the regular driver. A criminal who rents an automobile for the purpose of making a copy of the key would be spoiled should he return to steal the automobile as the fleet could be alarmed until the next use.

Thus, an objective of the instant invention is to provide an anti-theft device made operable by a pass key mounted encrypted code that is stored in a pre-programmed electronic chip powered upon receipt of voltage.

Still another objective of the instant invention is to provide an anti-theft device having an LED indicator centrally disposed in a vehicle mounted receptacle to said pass key mounted electronic chip.

Another objective of the instant invention is to provide an anti-theft device that allows an engine to run unattended and without a key wherein an attempt to move the vehicle without first disabling the anti-theft device will disable the engine.

Yet still another objective of the instant invention is to provide an anti-theft device that prevents car jacking by disabling the vehicle shortly after the alarmed vehicle is taken from its operator.

Another objective of the instant invention is to provide an anti-theft device having a wafer thin by-pass switch whose location can be hidden by the operator, the thin design of the switch allows the operator to conceal the switch under carpeting, in head liners, beneath the facia of a dashboard, and the like locations unavailable to conventional toggle switches.

Still another objective of the instant invention is to provide an anti-theft device that can use a master programmed chip for control of fleet vehicles.

Yet still another objective of the instant invention is to provide an anti-theft device that can incorporate a keypad for programming in situations such as fleet use wherein the keypad can be reprogrammed upon demand such as with a change of drivers.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention has been described in terms a specific embodiment, it will be readily apparent to those skilled in this art that various modifications, rearrangements and substitutions can be made without departing from the spirit of the invention. The scope of the invention is defined by the claims appended hereto.

Figure 1:
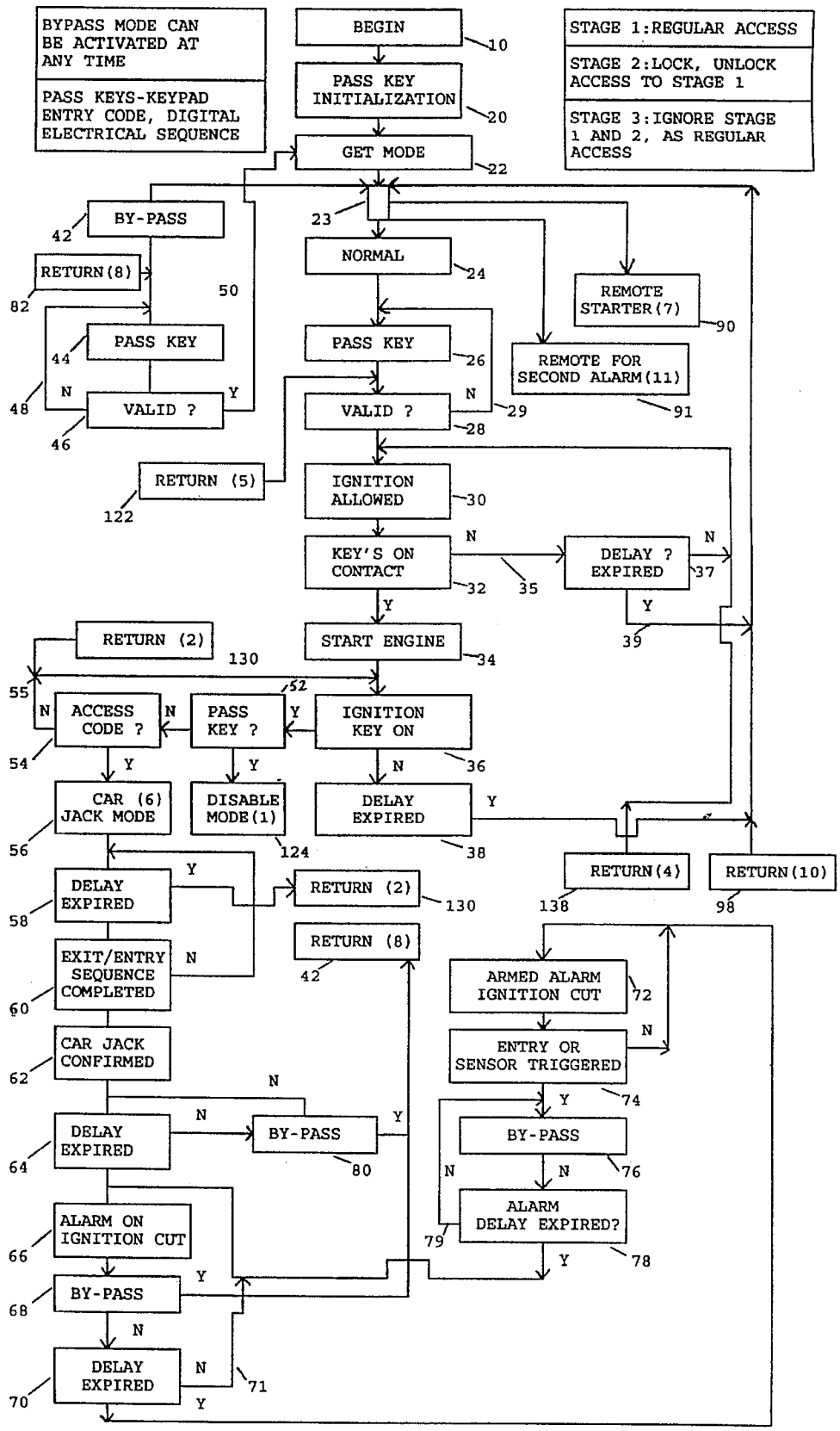
FIG. 1 is a schematic diagram of the anti-theft alarm system for attended and unattended vehicles of the instant invention.

Now referring to FIG. 1, shown is a flow schematic setting forth the operational sequence of the instant device. Beginning with numeral 10 a pass key is used to enable the system. Initialization takes place by either the use of an encrypted-coded pass key 20 or a keypad. Use of a keypad, not shown, incorporates a permanent and programmable code supplying a modulated voltage sequence for enabling of a control microprocessor. Use of the pass key 20 is by placement upon a receiver 22 for transfer of code from a pass key encrypted EPROM chip to a base micro-processor located in the system. If the vehicle is in a standard mode, the pass key 20 is checked 26 whether a stored code matches 24 a code stored within a vehicle mounted microprocessor. If the code does not match, a recheck 29 of the pass key is made. If the code matches the stored code, the ignition is allowed 30 wherein the automobile may be started in its ordinary and conventional manner wherein the ignition key 32 is inserted into the ignition switch and a normally opened relay placed in the ignition or fuel pump electrical supply line is energized allowing operation. Upon closure of the relay, the engine must be turned on within a preset time 35 of approximately 15 seconds, providing a continuous loop 37 to allowance 30 and should the timer 35 expire, the system will return 39 to the normal status 24 requiring reactivation by the pass key 26.

If the system is by-passed due to initiation of a hidden switch 42, a check is made for the pass key 44. If the pass key 44 is not valid 46 it is rechecked 48 continuously. Should the pass key be valid, the system is reset and returns to the get mode 22 step for receipt of code.

If the engine is on 36 a check is made for pass key 52 presentation. If a pass key is presented the vehicle is sent into a anti-thief disable mode 124 described in detail later in this specification. The system continuously checks whether the ignition key is on 36 and whether a pass key is present 52. If the system is in an attended mode, the initiation of an access code 54 states to the system that a possible car jacking situation is present 56. Once placed in a car jacking situation by double depression of the braking system or the like sequencing, a timer 58 will begin and should no external action occur the system will return 130 and continue a loop of checking whether the engine is on, or if the braking system sequencing is initiated. If the timer 58 has not returned the system to its preexisting loop, exit/entry 60 of the vehicle is monitored 62. If exit/entry occurs during the timing sequence 62, a car jack situation is confirmed 62. This begins a second timing sequence 64 that will operate for approximately sixty seconds so as to protect the owner of the vehicle by allowing the car jackers time to remove the vehicle from the expelled driver's vicinity prior to the alarm system and ignition cutoff sequence 66 disabling the vehicle. During the second timing sequence 64, a possible by-pass 80 might be entered. After the timing sequence 64 and once the system is disabled, the only way to stop the alarm and restart the vehicle is to initiate the by-pass 68 wherein the system is returned 42 to check for a valid pass key 44. If the by-pass 68 is not presented and the timer 70 expires, the system resets to an armed position 72 to prevent battery discharge. If no entry or the like sensor is triggered 74, the system will remain in an armed position. If the entry or sensor 74 is triggered, the system checks if it is being by-passed 76 and sets a timer 78 that will continually check for by-pass during the timing function. If no by-pass is presented, the system returns 71 to restart the alarm 66, all the while the ignition is disabled.

Figure 2:
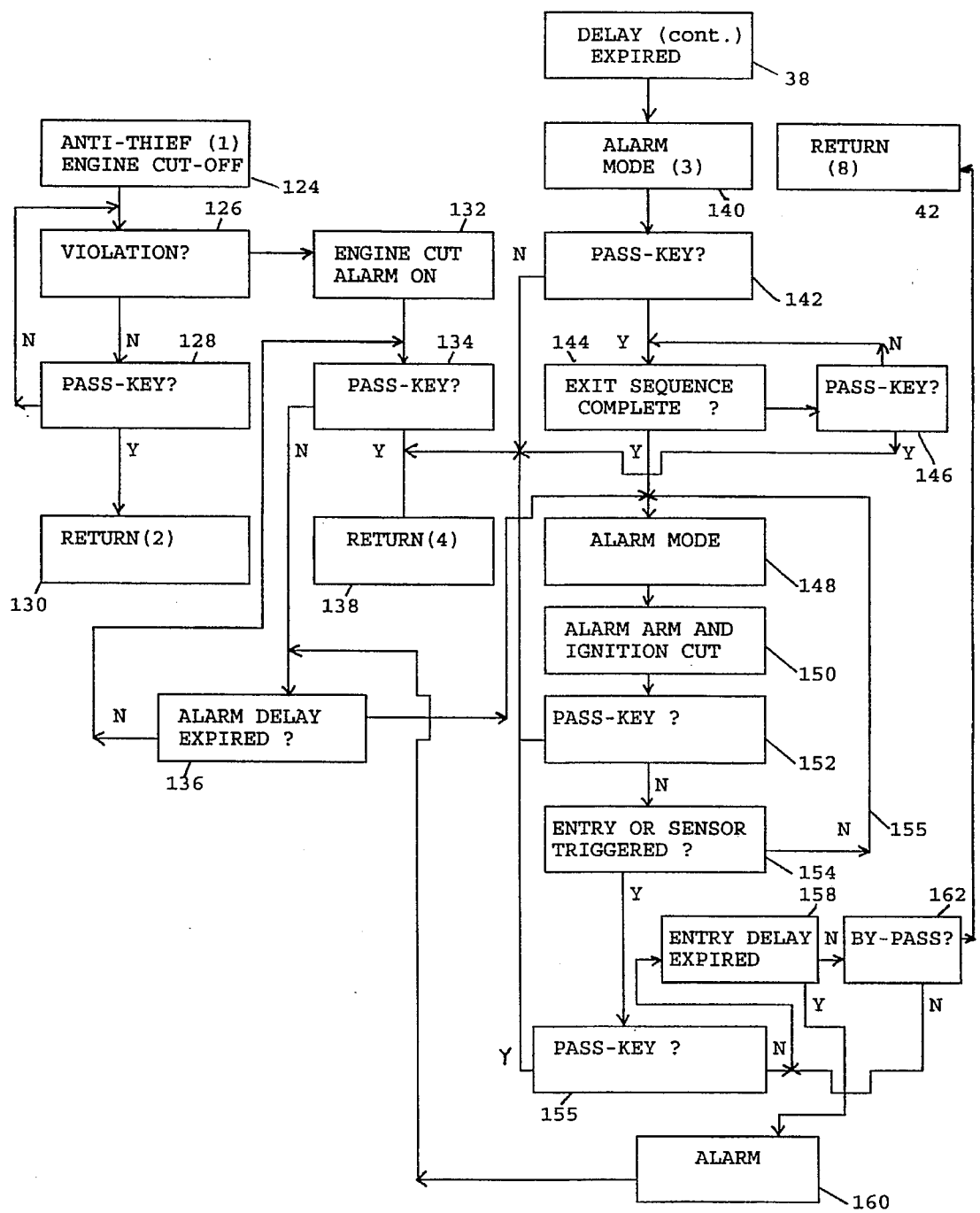
FIG. 2 is a continuation of the schematic diagram in FIG. 1.

Now referring to FIG. 2, in the anti-theft engine mode 124 the system determines if a violation has occurred 126. If no violation has occurred, a determination is made if there is a pass key present 128 and if none present, the system continuously checks if a violation has occurred 126. Once the pass key 128 is presented, the system returns 130 for determination if the ignition key is on 36 for further sequencing as shown in FIG. 1. If a violation 126 has occurred the engine is disabled and the alarm sequence 132 is initiated. Presentation of a pass key 134 silences the alarm and returns 138 the system to sequencing for ignition allowance 30. If no pass key 134 is presented, the alarm will be timed 136 until a pass key 134 is presented. If the alarm delay 136 times out the system will be armed 148 with the ignition disabled 150 and await if an entry or sensor 154 is triggered. If triggered a check is made for the pass key 155. Without a pass key 155 a timed delay begins 158 which can be by-passed 162 by the hidden by-pass switch, if no by-pass 162 is presented and the entry delay expires 158, the alarm 160 will initiate. The alarm will sound for a period of time 136 before resetting 148. The hidden by-pass switch is a wafer thin micro-switch that can be located anywhere in the vehicle, ie. beneath the carpeting, in the headliner, in the sun visor and so forth.

In continuation of the timer delay 38, the alarm mode 140 determines if the pass key is presented 142 as when the vehicle is parked and if not it returns 138 the system to allowance of the ignition 30. If the pass key 142 is presented, a determination is made if an exit 144 sequence is completed. If it has not been completed another check of the pass key is made 146, if not present the exit 144 sequence is checked, if present the system returns 138 to ignition allowance. If the exit sequence 144 is completed the system goes into an alarm mode 148 wherein the alarm is armed and the ignition is cut 150. If a pass key is presented 152, the system returns 138 to ignition allowance. If no pass key 152 is presented the system lies in wait for the entry or sensor to be triggered 154 providing a continuous loop 155 until either triggered 154 or the pass key presented 152. If an entry or sensor 154 is triggered, a check is made for the pass key 155. Without a pass key 155 a timed delay begins 158 which can be by-passed 162 by the hidden by-pass switch or no by-pass 162 is presented and the entry delay expires 158, allowing the alarm 160 to initiate. After a period of time 136 the system will return to an armed state 148.

Multi-level control is provided for fleet administration. Level One is available for use as stated above, the system is available to usual vehicle users. Level Two is available to those responsible for fleet security providing a function for unwanted vehicle use. This level can only be reached by a special electronic chip readable by all fleet equipped anti-theft systems. Upon reading of the chip, the system will deny access to the usual user and, if installed, will transfer to the alarm mode. This function is disabled with an additional reading of the chip. Level Three is available to a supervisor, fleet owner and the like. To obtain this level, another special chip is used that will act as a pass key and is readable by all fleet equipped vehicles.

Figure 3:
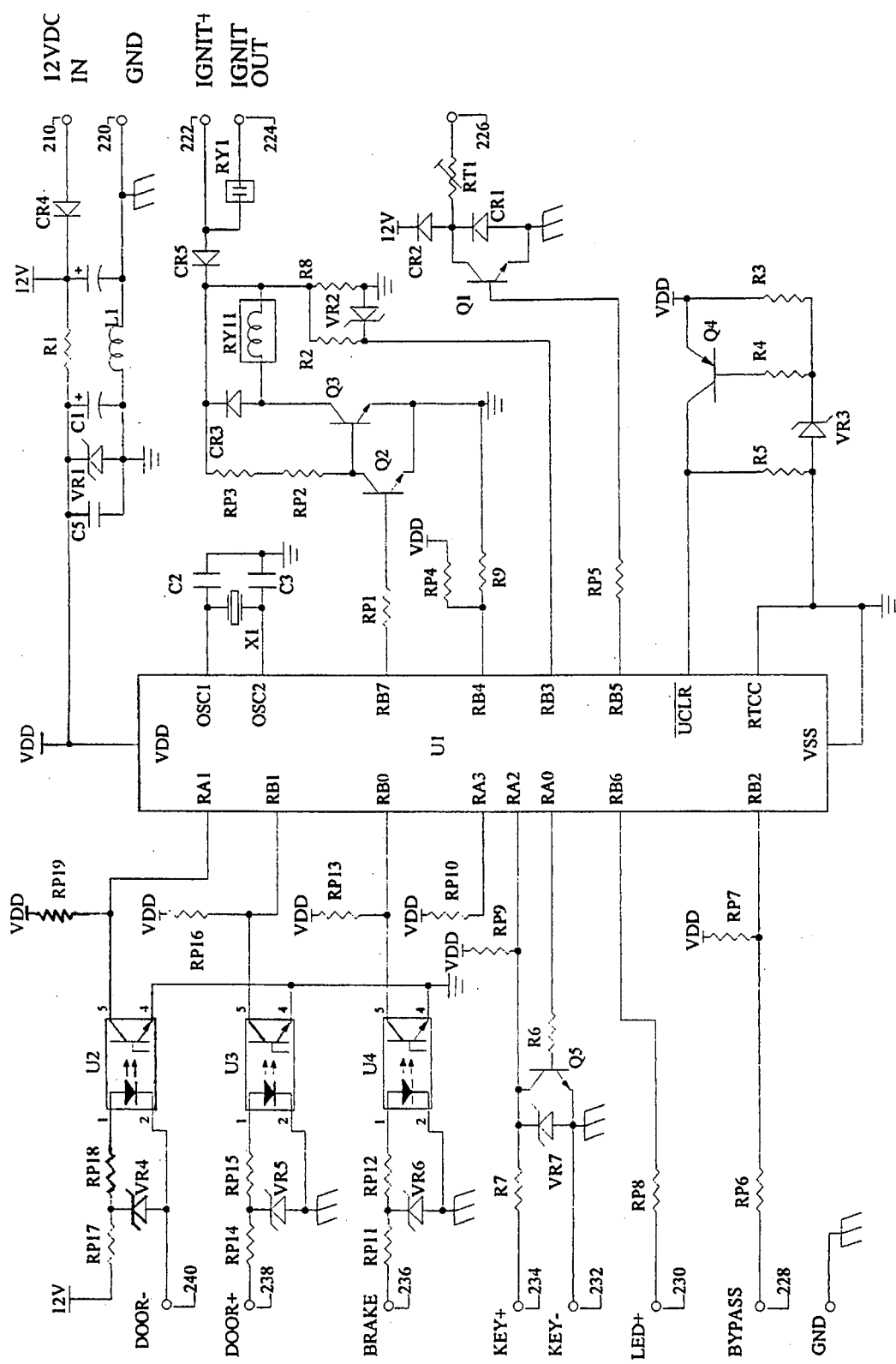
FIG. 3 is an electrical schematic of the anti-theft alarm system of the instant invention.

Now referring to FIG. 3, shown is the electrical schematic of the instant invention based on a PIC1C84XTI microprocessor U1 for a Stage 1,2 and 3 alarm system and a PIC1C71XTI for an alarm system based upon keypad input. The alarm system is coupled to a 12 volt supply 210 having a ground 220 as found in conventional automobile vehicles. The voltage is stabilized to the microprocessor by use of check diode CR4 with capacitors C4 and C1 discharging over voltages to ground. A no resistant noise filter L1 lessens line spikes. Resistor R1 having a 5.1 zenar diode VR1 and 50 volt capacitor C5 provides an initial step-up voltage of 24 to 36 volts and a constant voltage of 5.1 volts to the microprocessor U1.

Timing for the circuitry is performed by use of a 3.58 crystal oscillator X1 jumped across OSC1 and OSC2 of the microprocessor, each connection having a capacitor C2 and C3 maintaining constant power to the oscillator. The timing circuit provides precise timing for all functions including the car jacking mode where it is imperative that the car jackers are given ample time to leave the area so as to avoid harming the owner of the vehicle when they discover the vehicle is disabled.

Actual disablement and alarming of the system is performed through RB7 having a resistor RP1 and transistors Q2 and Q3. Resistors RP2 and RP3 set forth a series-parallel flow arrangement with diode CR3 and transistor protector RY11, RY11 prevents ignition feedback upon turning off of the vehicle. Relay RY1 is a normally opened relay that is closed if the system is in an operational mode thus allowing the coupling of 222 to 224 thereby completing an electrical circuit. This coupling is preferable the ignition switch wherein opening of the relay RY1 will disable the vehicle. Alternatively, the system may be coupled in series with an electric fuel pump. Zenar diode CR5 is provided to prevent voltage feedback to the system. Should a voltage spike occur, a filter RY11 prevents damage to the transistors. With the transistors Q2 and Q3 in a cascading position, if the microprocessor becomes disabled the power to the relay RY1 will be maintained so that the vehicle is not inadvertently disabled. RB3 checks voltage to the relay using step down resistors R2 and R8 through zenar diode VR2.

RB5 provides a means for sounding the vehicles horn 226 having a resistor RP5 placed before transistor Q1. Thermistor RT1 coupled to a horn relay, diodes CR1 and CR2 prevent reverse voltage to the transistor or microprocessor. A relay or fuse could be used in place of the thermistor. It should also be noted that the use of a microprocessor with memory can by used for enabling as well as conventional encrypted coded devices.

Coupled to UCLR is a low voltage protection circuit. A voltage less than 5 volts will cause the microprocessor to perform erratically. This occurs when the voltage to the microprocessor is low due to battery supply or restart. For instance, in cold weather excess cranking of an engine will cause the battery power to drain supplying less than 4 volts. In this instance the circuitry will drain the current through transistor Q4 to ground. In effect, zenar diode VR3 disconnects the microprocessor from the battery. Similarly, upon start-up of a dead battery it is preferred that the microprocessor remains in an off state until the voltage in the system reaches at least 4 volts. The system is by-passed by input RB2 upon grounding of a switch 228 though resistor RP6 having VDD input through resistor RP7. RB6 provides voltage to LED 230 buffered by a resistor RP8. The remote chip made operational by sending a 5 volt charge to the chip for reading of an encrypted code thereon. Operation of the key is verified by the microprocessor and protected from over voltage by zenar diode VR7 causing over voltage to be directed to ground.

Operation of the brakes 236 is the preferred embodiment of initializing the attended anti-theft portion of the invention. An insulated transistor U4 operated by a diode verifies whether the brakes have been energized by providing input to RB0. Zenar diode VR6 provides over voltage protection. Opening of a door 238, which energizes an interior light, causes a second sequence in initializing the attended anti-theft portion of the invention. The door provides current to the insulated transistor U3 operated by a diode to verify whether a door has been opened thus providing input to RB1, zenar diode VR5 providing over voltage protection. On certain European and Ford vehicles having a positive ground, external voltage is not supplied by opening of a door 240 but rather can be supplied by coupling 242 to the battery so as to power the transistor U2 as read by the diode for input into RA1. Removing resistor RP10 disables the attendant portion of anti-theft system.

It is to be understood that while I have illustrated and described certain forms of my invention, it is not to be limited to the specific forms or arrangement of parts herein describe and shown. It will be apparent to those skilled in the art that various changes may be made without departing from the scope of the invention and the invention is not to be considered limited to what is shown in the drawings and described in the specification.

What is claimed is:

1. An anti-theft system for use with unattended and attended vehicles comprising: a base microprocessor; a normally opened relay electrically coupled to said microprocessor for use in disabling an electrical circuit in a vehicle; a means for carrying an encrypted code; a reader mounted in said vehicle available for reading said carried code through close proximate contact of said code carrying means with said reader, wherein said reader transfers said code to said microprocessor; and a means for enabling said base microprocessor while said vehicle is attended defined as a sequential depression of a vehicle brake pedal followed by opening of a door within a predetermined time whereby said electrical circuit will be disabled during a car jacking situation.

2. The anti-theft system according to claim 1 wherein said electrical circuit is an electronic ignition.

3. The anti-theft system according to claim 1 wherein said electrical circuit is a power supply to an electric fuel pump.

4. The anti-theft system according to claim 1 wherein said relay includes a means for maintaining said relay in a closed position should said microprocessor become disabled.

5. The anti-theft system according to claim 1 wherein said reader includes a centrally disposed light emitting diode, said diode coupled to said microprocessor providing an indication of microprocessor status.

6. The anti-theft system according to claim 1 wherein said system includes a wafer thin micro-switch for use as a by-pass switch for disabling said microprocessor, said bypass switch available for placement in discrete areas of a vehicle such as between two layers of fabric.

7. The anti-theft system according to claim 1 wherein said system includes a keypad with a permanent and programmable code supplying a modulated voltage sequence for enabling said microprocessor.

8. The anti-theft system according to claim 1 wherein said carried encrypted code is stored in an EPROM chip with said reader unit supplying a voltage to said EPROM for reading said code.

9. The anti-theft system according to claim 1 including a master remote microprocessor for use in fleet applications, said master remote microprocessor having an encrypted code matching said code in said base microprocessor and thereby enabling or disabling said base microprocessor.

10. The anti-theft system according to claim 1 including a remotely carried chip having an encrypted code readable by all fleet vehicles having an installed system whereby activation of the system will deny access to a user and will activate an alarm mode.

11. The anti-theft system according to claim 10 wherein said chip operates as a pass key.

12. A method of disabling a vehicle during a car jacking situation comprising the steps of:
 a) installing a cut-off relay in an electrical circuit of a vehicle, wherein said uninterrupted circuit is necessary for continued locomotion of said vehicle;
 b) coupling said relay to a microprocessor;
 c) coupling said microprocessor to a brake sensor switch;
 d) coupling said microprocessor to an entry/exit door switch;
 e) coupling said microprocessor to an encrypted code reader means for sensing a user bypass;
 f) programming said microprocessor to perform an anti-carjacking sequence comprising the steps of:
  i) sampling said brake sensor switch for a sequential series of switch activations;
  ii) starting a first delay timer period upon sensing the proper number of said brake sensor switch activations;
  iii) sampling said entry/exit door switch for an activation, with no user bypass, within said first timer period thereby confirming a carjack situation;

iv) starting a second delay timer period upon carjack confirmation and check for user bypass within said second timer period;

vii) upon completion of said second timer period, opening said relay to disable said vehicle and activate an alerting vehicular alarm.

13. The method according to claim 12 wherein said sequential series of brake switch activations is provided by quickly twice depressing the brake of said vehicle.

14. The anti-theft system of claim 12 wherein said means for enabling said base microprocessor while said vehicle is attended consists of a sensor which detects two quick depressions of the brake pedal of said vehicle and thereafter detecting whether the door has opened within a programmable time period.

15. The method according to claim 14 wherein said encrypted code reader means includes a powered reader with a centrally disposed light wherein said reader supplies a voltage to a code carrying EPROM chip upon contact of said chip with said reader, said reader thereby reading said code from said EPROM.

16. The method according to claim 15 wherein said first delay timer period is approximately five seconds.

17. The method according to claim 16 wherein said second timer period is approximately 60 seconds.

18. The method according to claim 12 wherein said electrical circuit of said vehicle is an ignition circuit.

19. The method according to claim 12 wherein said electrical circuit of said vehicle is a fuel flow control circuit.

20. The method according to claim 12 wherein said alerting vehicular alarm includes visual and audio components.

21. The method according to claim 12 which further comprises the steps of:

a) sampling for a user by-pass after activation of said vehicular alarm for a battery saving timer period;

b) resetting said alarm system to an armed state, with said electrical circuit still interrupted via said relay, after expiration of said battery saving timer period to prevent excessive battery discharge;

c) continuously sampling for activation of said entry/exit switch;

d) sampling for a user bypass if entry/exit activation occurs;

e) starting an alarm delay timer period and sampling for a user bypass until said alarm delay timer period expires;

f) repeating the activation of said vehicular alarm and repeating steps a) through e) above until an appropriate user bypass occurs.

22. An anti-theft system for use with unattended and attended vehicles comprising:

a base microprocessor;

a normally opened relay electrically coupled to said microprocessor for use in disabling an electrical circuit in a vehicle wherein said circuit is necessary for continued locomotion of said vehicle;

a means for carrying an encrypted code by a user;

a reader mounted in said vehicle available for reading said carried code through close proximate contact of said code carrying means with said reader, wherein said reader transfers said code to said microprocessor;

a means for enabling said base microprocessor for operation while said vehicle is unattended whereby said electrical circuit will be disabled during a theft situation;

a means for enabling said base microprocessor for operation while said vehicle is attended whereby said electrical circuit will be disabled during a car jacking situation;

a vehicular alarm for alerting observers of a carjacking or theft situation.

23. The anti-theft system of claim 22 wherein said means for enabling said base microprocessor for operation while said vehicle is attended or unattended consists of arming said relay and vehicular alarm through presentation of said code carrying device to said reader.

24. The anti-theft system of claim 23 wherein said means for enabling said base microprocessor while said vehicle is attended, said means for enabling consists of a sensor which detects two quick depressions of the brake pedal of said vehicle and thereafter detecting whether the door has opened within a programmable time period.

* * * * *